United States Patent [19]
Roddy

[11] Patent Number: 5,881,606
[45] Date of Patent: Mar. 16, 1999

[54] BICYCLE HANDLEBAR ATTACHMENT DEVICE

[75] Inventor: Brian Anthony Roddy, Madison, Wis.

[73] Assignee: Trek Bicycle Corporation, Waterloo, Wis.

[21] Appl. No.: 806,202

[22] Filed: Feb. 26, 1997

[51] Int. Cl.$^6$ .......................... B62K 21/16; B62K 21/12; B62K 1/00; B25G 3/20

[52] U.S. Cl. ........................ 74/551.3; 74/551.1; 280/279; 403/373

[58] Field of Search ................................ 74/551.1, 551.2, 74/551.3, 551.8; 403/373, 374.1, 380, 334; 280/279

[56] References Cited

U.S. PATENT DOCUMENTS

| | | | |
|---|---|---|---|
| D. 368,678 | 4/1996 | Wilcox | D12/111 |
| 5,373,757 | 12/1994 | Bigall | 74/551.3 |
| 5,678,458 | 10/1997 | Kao | 74/551.3 |

OTHER PUBLICATIONS

U.S. application No. 29/006,895, Roddy, filed Feb. 26, 1997.

Primary Examiner—Charles A. Marmor
Assistant Examiner—Brandon C. Stallman
Attorney, Agent, or Firm—Nilles & Nilles, S.C.

[57] ABSTRACT

A handlebar clamping device includes a clamping body, a conventional C-clamp for clamping the body to a vertical steerer tube on the steering fork of the bicycle, and a recessed clamping surface for clamping the body to the handlebar. The recessed area of the body of the clamp includes a first semi-cylindrical clamping surface situated between a pair of tapered inner walls. The device further includes a cover member which has two outwardly projecting prongs which define a second semi-circular clamping surface, and further define a pair of tapered outward walls. The outward protruding prongs on the cover member are inserted into the recessed area of the clamping body so that the first and second tapered outer walls are in opposing surface to surface contact with the first and second tapered inner walls on the clamping body, respectively. The handlebar is clamped in place between the first and second semi-cylindrical clamping surfaces, and the opposing tapered walls cause the protruding prongs to also become compressed against the outer circumference of the handlebar.

12 Claims, 2 Drawing Sheets

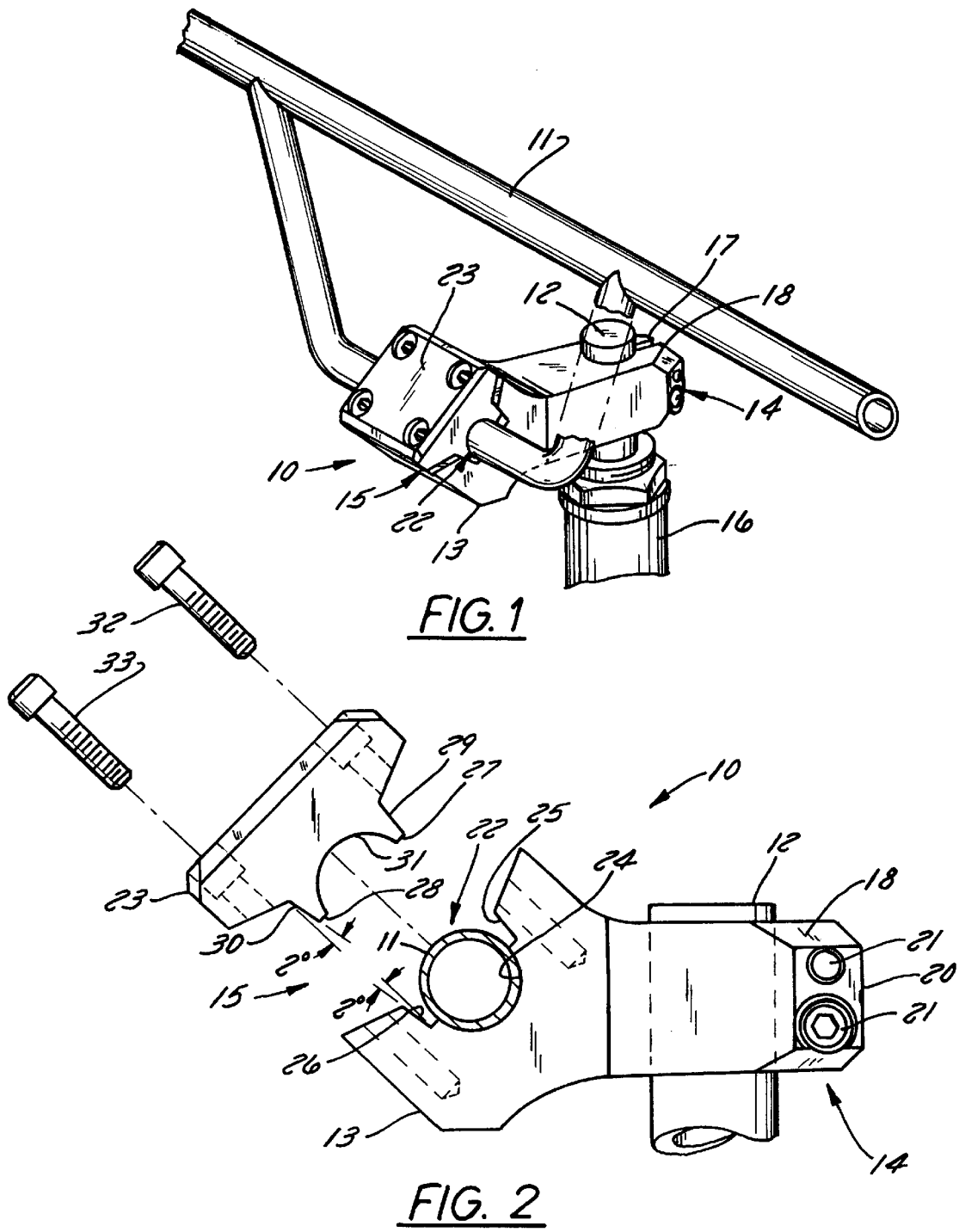

BICYCLE HANDLEBAR ATTACHMENT DEVICE

BACKGROUND OF THE INVENTION

1. Field of the Invention

The present invention relates to a clamping device for attaching a handlebar to a steering fork on a bicycle.

2. Background of the Related Art

In a class of cycling known as bicycle motocross, commonly referred to as BMX, riders perform a number of stunts, such as riding on one wheel (known as "wheelies"), riding the bicycle off the end of a ramp and twisting and turning on the bicycle in mid-air, and riding on unusually difficult and challenging terrain. Racing on short tracks having various obstacles is also a common event in BMX cycling. As might be expected, the bicycle itself is subjected to a great deal of punishment during such events.

The characteristics of a BMX bicycle typically include relatively small wheels, a short frame, a high seat post and high handlebars. The steering fork, to which the front wheel is attached, includes an upward protruding vertical steerer which is inserted through the neck of the frame. The steerer is essentially a metal pipe or tube. The handlebar is attached to the top of the steering fork with a clamping device which includes some type of means for clamping the device to the steerer, and a second means for clamping the device to the handlebar.

On current BMX bicycles (and on many other models, too), the means for attaching the handlebar is typically comprised of a relatively flat surface with a semi-cylindrical recess in the body of the clamp, a cover plate also with a semi-cylindrical recess, and a set of fasteners for fastening the cover plate to the body of the clamp. The handlebar is essentially sandwiched between semi-cylindrical recesses in the cover plate and body of the clamp.

There are a number of drawbacks with current clamps of this design. In lesser quality clamping devices made of low grade material, the cover tends to flex and bend over time, and consequently the handlebar becomes loose, requiring retightening. In the event the handlebar becomes loose during a race, retightening the clamp is not possible. For higher quality clamping devices made from hardened metals, the cover does not bend, but instead causes the handlebar to become flattened or "out of round." In severe cases, a portion of the handlebar becomes squeezed outwardly in between the gap between the cover plate and body of the clamp. It is quite common for riders to make various adjustments to a BMX bicycle for different stunts and events. However, a handlebar which has become "out of round" cannot be properly adjusted for different events.

Consequently, an improved clamping device for attaching the handlebar to the steering fork is desired.

SUMMARY OF THE INVENTION

A bicycle handlebar clamping device which includes a pair of protruding tapered prongs which fit within a pair of corresponding recessed tapered walls in the body of the clamp is disclosed. The protruding tapered prongs essentially pinch the handlebar within a recessed clamping space in the body of the clamp in order to hold the handlebar in place. More specifically, the clamping device of the present invention comprises a clamping body having a U-shaped portion defining a recessed area which includes a semi-cylindrical clamping surface set between a pair of spaced apart tapered inner walls. The cover includes a pair of projecting prongs. The outer walls of the prongs are also tapered so that they fit within and abut against the tapered walls in the clamping body. The space between the two projecting prongs likewise defines a semi-cylindrical clamping surface.

The handlebar is compressed between the two semi-cylindrical clamping surfaces on the cover and body of the clamp. Moreover, upon tightening of the cover, the tapered outer walls on the prongs, which are in opposing surface-to-surface contact with the tapered inner walls of the body of the clamp, compress the prongs toward each other, thereby compressing the prongs against the outer circumference of the handlebar.

There are several advantages to this new and improved design for a bicycle handlebar clamping device. First, the semi-cylindrical clamping surfaces of the present invention cover and engage a greater surface area of the circumference of the handlebar than do prior art clamps. Prior art clamps typically covers less than 80% of the circumference of the handlebar, while the present invention covers about 91% of the circumference of the handlebar. Also, rather than merely squeezing the handlebar between two pressure points, namely, the cover and the body of the clamp, the prongs essentially wrap around the handlebar and provide gripping forces on the side of the handlebar.

In addition, instead of causing the handlebar to bulge and become flattened, the prongs compress the handlebar inwardly, so the handlebar does not become "out-of-round." Consequently, the handlebar may be repositioned as needed and desired by the rider. Also, because the tabs "dig" into the surface of the handlebar, each prong has the effect of resisting rotational torque forces exerted by the rider against the handlebar. In other words, a typical BMX handlebar has grips which are located approximately 8 to 12 inches above the central portion of the handlebar which is attached to the clamp. That 8 to 12 inch offset position of the grip exerts a tremendous amount of torque on the clamp, especially during stunts in which the rider puts some or all of his body weight on the handle bars (e.g., in some stunts the rider will do a hand stand on the handlebar while riding the bicycle).

Other objects, features and advantages of the present invention will become apparent to those skilled in the art from the following detailed description and accompanying drawings.

BRIEF DESCRIPTION OF THE DRAWINGS

The drawings, which constitute part of this specification and include an exemplary embodiment of the present invention, include the following.

FIG. 1 is a perspective view of the clamping device of the present invention for use in attaching a handlebar to the neck of a steering fork on a bicycle.

FIG. 2 is a side view of the handlebar clamping device.

DETAILED DESCRIPTION OF THE INVENTION

Figure 3:
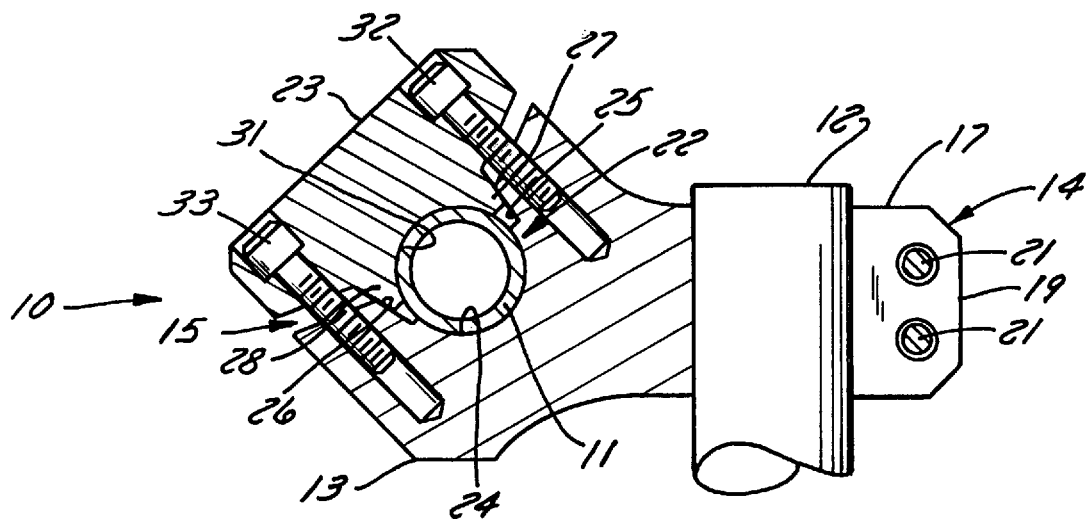
FIG. 3 is a cross-section view of the handlebar clamping device.
Figure 4:
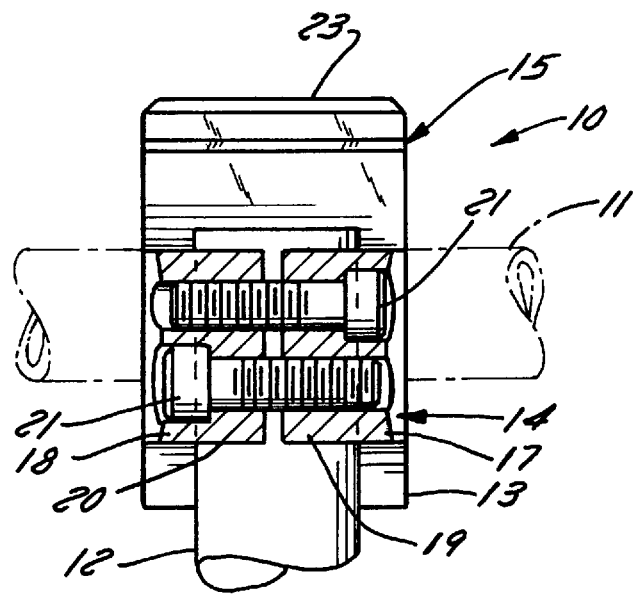
FIG. 4 is a cross-section view of the handlebar clamping device.

Referring to the drawings, in which like reference numerals refer to like parts, a clamping device 10 for attaching a handlebar 11 to a steering fork 12 on a bicycle comprises, generally, a clamping body 13, a first means 14 for clamping the body to the steering fork, and a second means 15 for clamping the body to the handlebar.

The steering fork on a bicycle ordinarily includes an upward protruding generally vertical tube, often referred to as the steerer 12, which extends through the neck 16 of the frame of the bicycle. The clamping body 13 is attached to the top of the steerer 12 on the steering fork. The means for doing so, in the preferred embodiment shown in the drawings, is essentially a conventional C-clamp which is similar to other such means found in the prior art. In other words, the first means 14 for clamping the body 13 to the steering fork includes a first stem clamping portion 17 which wraps around one side of the top of the steerer 12, and a second stem clamping portion 18 which wraps around the other side of the top of the steerer 12. The first and second clamping portions 17 and 18 define a C-clamp which wraps nearly completely around the steerer tube 12 on the top of the steering fork.

The C-clamp is fastened to and tightened on the end of the steering fork in the following manner. The first stem clamping portion 17 has a first end 19, and the second stem clamping portion 18 has a second end 20. The first and second ends 19 and 20 are slightly spaced apart. Moreover, the device includes at least one fastener 21, such as a threaded bolt, connected to the first and second ends 19 and 20 on each of the first and second stem clamping portions 17 and 18, respectively. The fastener 21 provides a means for compressing the end portions 19 and 20 together to tighten the C-clamp around the steerer 12. In other words, tightening the fastener results in bringing the first end 19 and second ends 20 of the C-clamp together, which further results in a reduction of the circumference of the C-clamp thereby tightening it around the round tubular steerer 12 of the steering fork.

The second means 15 for clamping the body 13 to the handlebar 11 comprises, generally, a recessed clamping surface 22 in the body 13 of the clamp, and a cover member 23. More specifically, the clamping body 13 includes a generally U-shaped portion which defines a central recessed area 22. The central recessed area 22 defines a first semi-cylindrical clamping surface 24 which has a radius corresponding approximately to the radius of the handlebar 11 being clamped. The central recessed area 22 further defines a first inner wall portion 25 and a second inner wall portion 26. The first and second inner wall portions are generally facing each other, and are spaced apart a distance greater than the radius of the first semi-cylindrical clamping surface 24.

The first and second inner wall portions 25 and 26 are also slightly tapered so that, on a lower end immediately adjacent to the first semi-cylindrical clamping surface 24 the first and second inner tapered walls are relatively closer to each other and the opposite outer ends of the first and second inner walls are spread apart a slightly greater distance. In a preferred embodiment shown in FIG. 2, the inner walls 25 and 26 are provided with an approximately 2° taper, although the exact degrees of taper may be modified for a particular design or operation.

The cover member 23 is fastened over the recessed area 22 of the clamping body 13 in order to clamp the handlebar 11 to the bicycle. The cover member 23 includes a first prong 27 and a second prong 28 which protrude outwardly from the bottom of the cover member 23 and, when applied to the clamping body 13 protrude inwardly into the recessed area 22 of the clamping body 13. In other words, the first and second prongs 27 and 28 are insertable, at least partially, into the recessed area 22 in the clamping body 13.

The first prong 27 defines a first tapered outer wall 29, and the second prong 28 defines a second tapered outer wall 30.

The tapered outer walls 29 and 30 on the prongs are, in the preferred embodiment shown in FIG. 2, likewise provided preferably with a 2° taper so that, when the first and second prongs 27 and 28 are inserted into the recessed area 22 on the clamping body 13, the first tapered outer wall 29 on the cover 23 is in opposing surface to surface contact with the first tapered inner wall 25 on the clamping body 13 and the second tapered outer wall 30 on the cover 23 is in opposing surface to surface contact with the second tapered inner wall 26 in the clamping body 13.

The surface of the cover member 23 also defines a second semi-cylindrical clamping surface 31 which is located between the first and second outwardly protruding prongs 27 and 28. The second semi-cylindrical clamping surface 31 likewise has a radius corresponding approximately to the radius of the handlebar 11. Thus, when the cover member 23 is applied to the body 13 of the clamp, the central portion of the handlebar 11 is held in place between two opposite facing semi-cylindrical clamping surfaces 24 and 31.

The device 10 further includes at least one fastener 32 positioned radially outwardly from the first prong 27 on the cover member 23 for clamping that portion of the cover member to the clamping body 13. The device 10 further includes at least one other fastener 33 connected to the opposite portion of the cover member 23, that other fastener also being positioned radially outwardly from the second prong 28 on the cover member, for connecting the opposite portion of the cover member 23 to the clamping body 13. Again, fasteners such as a threaded bolt with either a traditional hex head or an allen wrench type socket head and other equivalent fasteners are acceptable for this purpose.

Upon tightening of the cover member 23 to the body 13 of the clamp, the central portion of the handlebar 11 becomes compressed between the first and second semi-cylindrical clamping surfaces 24 and 31. Moreover, as the cover member 13 is further tightened, the first and second prongs 27 and 28 are forced further into the recessed area 22 of the clamping body 13. When this occurs, the opposing inner and outer tapered walls 25, 26, 29, 30 on the clamping body and cover member compress the prongs 27 and 28 inwardly toward each other, thereby further compressing and clamping the central portion of the handlebar 11 between the first and second prongs 27 and 28, respectively.

The handlebar clamping device presented herein has been described in specific reference to a preferred embodiment shown in the drawings which includes, among other details, a 20° taper for the protruding prongs and recessed walls in the body of the device. Such specific details are naturally presented for descriptive purposes only. Therefore, specific structural and functional details disclosed above are not to be interpreted as limiting, but merely as a basis for the claims and for teaching one skilled in the art to variously employ the present invention in any appropriately detailed manner. Changes may be made in the details of construction, arrangement or operation of the invention without departing from the spirit of the invention.

Finally, it should be noted that the applicant herein has also filed an application for a design patent, said design application having been filed on the same date and under the same inventor, assignee and title as the present application, and accordingly any subject matter disclosed in said design application is fully incorporated herein by reference.

I claim:

1. A clamping device for attaching a handlebar to a steering fork on a bicycle, said clamping device comprising:

a clamping body;

first means for clamping said body to said steering fork; and second means for clamping said body to said handlebar, said second means comprising:
- a U-shaped portion of said clamping body defining a central recessed area, said recessed area including a first tapered inner wall, a second tapered inner wall, and a first semi-cylindrical clamping surface between said inner walls;
- a cover member fastened over said recessed area of said clamping body, said cover member including a first prong and a second prong, said first prong defining a first tapered outer wall, said second prong defining a second tapered outer wall, and said cover member further including a second semi-cylindrical clamping surface between said first and secondary prongs;
- said first and second prongs on said cover member being insertable into said recessed area in said clamping body so that said first and second tapered outer walls are in opposing surface to surface contact with said first and second tapered inner walls, respectively; and
- fastening means for fastening said cover member to said clamping body so that said handlebar is compressed between said first and second semi-cylindrical clamping surfaces and so that said first and second prongs are compressed by said opposing tapered walls against the surface of said handlebar.

2. The clamping device of claim 1, wherein the means for fastening said cover member to said clamping body comprises:
- at least one fastener connecting one portion of said cover member to said clamping body, said fastener positioned radially outwardly from said first tapered inner wall; and
- at least one other fastener connecting an opposite portion of said cover member to said clamping body, said other fastener positioned radially outwardly from said second tapered innerwall.

3. The clamping device of claim 1, wherein the first means for clamping said body to said steering fork comprises:
- a first steerer tube clamping portion on said clamping body;
- a second steerer tube clamping portion on said clamping body;
- said first and second steerer tube clamping portions defining a C-clamp for clamping said body to a substantially vertical steerer tube on said steering fork, and said first and second steerer tube clamping portions having slightly spaced apart end portions; and
- means for compressing said end portions together to tighten said C-clamp around said steerer tube.

4. The clamping device of claim 3, wherein the means for compressing said end portions together comprises at least one fastener connected to the end portions on each of said first and second steerer tube clamping portions of said body.

5. A clamping device for attaching a handlebar to a steering fork on a bicycle, said clamping device comprising:
- a clamping body comprising a first means for clamping said body to a substantially vertical steerer tube on said steering fork and a second means for clamping said body to a substantially horizontal central portion of said handlebar, said second means comprising:
  - a central recessed area in said clamping body defining a semi-cylindrical portion having a radius corresponding approximately to the radius of the horizontal central portion of said handlebar, said central recessed area further defining a first inner wall portion and a second inner wall portion, said first and second inner wall portions being spaced apart a distance greater than the radius of said semi-cylindrical portion, and said first and second inner wall portions having slightly tapered surfaces;
  - a clamping cover member, said cover member including a first prong defining a first tapered outer wall and a second prong defining a second tapered outer wall, said first and second prongs being spaced apart and having therebetween a recessed semi-cylindrical surface also having a radius corresponding approximately to the radius of the horizontal central portion of said handlebar, and said first and second tapered outer walls having tapered surfaces corresponding to the tapered surfaces of said first and second inner wall portions on said clamping body; and
  - means for fastening the clamping cover member to the clamping body whereby tightening of said clamping devices causes said first and second tapered outer walls to be squeezed together by said first and second inner wall portions, respectively.

6. The clamping device of claim 5, wherein the means for fastening said cover member to said clamping body comprises:
- at least one fastener connecting one portion of said cover member to said clamping body, said fastener positioned radially outwardly from said first inner wall portion of said clamping body; and
- at least one other fastener connecting an opposite portion of said cover member to said clamping body, said other fastener positioned radially outwardly from said second inner wall portion of said clamping body.

7. The clamping device of claim 5, wherein the first means for clamping said body to said steering fork comprises:
- a first steerer tube clamping portion on said clamping body which wraps around a portion of the top of the steerer tube on said steering fork;
- a second steerer tube clamping portion on said clamping body which wraps around another portion of the top of the steerer tube on said steering fork;
- said first and second steerer tube clamping portions defining a C-clamp for clamping said body to the vertical steerer tube of the steering fork, and said first and second steerer tube clamping portions having slightly spaced apart end portions; and
- means for compressing said end portions together to tighten said C-clamp around said steerer tube.

8. The clamping device of claim 7, wherein the means for compressing said end portions together comprises at least one fastener connected to the end portions on each of said first and second steerer tube clamping portions of said body.

9. A bicycle handlebar clamping device comprising:
- a clamping body;
- means for clamping said body to a substantially vertical steerer tube of a steering fork on a bicycle;
- a central recessed area in said clamping body defining a first inner tapered wall, a second inner tapered wall, and a first semi-cylindrical portion between said inner walls;
- a cover member having a clamping surface defining first prong, a second prong, and a second semi-cylindrical portion between and first and second prongs, said first prong including a first outer tapered wall and said second prong including a second outer tapered wall, and said first and second prongs being insertable into the central recessed area in said clamping body so that said first and second outer tapered walls on the cover member are in opposing surface to surface contact with said first and second inner tapered walls on the clamping body; and fastening means for fastening said cover member to said clamping body so that said first and second outer tapered walls become compressed between said first and second inner tapered walls.

10. The clamping device of claim 9, wherein the means for fastening said cover member to said clamping body comprises:

at least one fastener connecting one portion of said cover member to said clamping body, said fastener positioned radially outwardly from said first inner tapered wall; and at least one other fastener connecting an opposite portion of said cover member to said clamping body, said other fastener positioned radially outwardly from said second tapered inner wall.

11. The clamping device of claim 9, wherein the first means for clamping said body to said steering fork comprises:

a first steerer tube clamping portion on said clamping body;

a second steerer tube clamping portion on said clamping body;

said first and second steerer tube clamping portions defining a C-clamp for clamping said body to the steerer tube of the steering fork, and said first and second steerer tube clamping portions having slightly spaced apart end portions; and means for compressing said end portions together to tighten said C-clamp around said steerer tube.

12. The clamping device of claim 11, wherein the means for compressing said end portions together comprises at least one fastener connected to the end portions on each of said first and second steerer tube clamping portions of said body.

* * * * *